Figure 1:
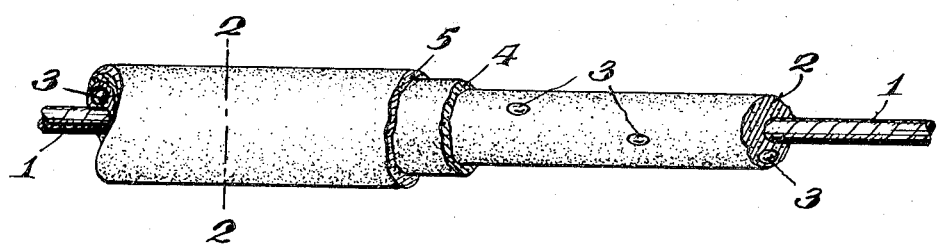

Jan. 4, 1944. A. C. FISCHER 2,338,103
GELATINIZED SEED BEARING CORD
Filed June 17, 1940

Inventor
Albert C. Fischer
By Knight Bros.
Attorney

Patented Jan. 4, 1944

2,338,103

UNITED STATES PATENT OFFICE 2,338,103

GELATINIZED SEED BEARING CORD

Albert C. Fischer, Chicago, Ill.

Application June 17, 1940, Serial No. 341,060

6 Claims. (Cl. 47—56)

This application constitutes a continuation in part of my application, Serial No. 8,715, filed February 28, 1935, and relates to the known system in planting seeds, of predetermining the location of the seeds by mounting them at selected points along an elongated carrier, generally heretofore in the form of a strip of sheet-like material to which the seeds were adhered by mucilage or other adhesive, and upon which was also mounted in a position surrounding each individual seed, a pat of plant food with or without insecticide.

The object of the present invention is to provide an improved form of carrier, and particularly one which may be more conveniently made and stored; one which will supply moisture as well as plant food to the germinating seeds mounted thereon; and one which may be planted more easily and more effectively. Accordingly the present invention comprises making the carrier in the form of a cord, surrounded by a moisture gathering jacket of colloidal material with the cord at its center and embedding in the colloidal jacket, at suitable intervals, seeds that will be nurtured by or through the colloidal jacket, both as to moisture and plant food; the plant food being, if desired, incorporated in the colloidal jacket, but preferably placed as a coating around the jacket; and an insecticide or parasite repellent being also present, either as an incorporated ingredient of the colloid, or of the plant food, but preferably as a further coating.

While the colloid jacket might be permitted to dry to a state of rigidity and it will in any embodiment of the invention be allowed to set until it attains physical integrity that renders it form-retentive; the drying or setting will preferably be limited by including a sufficient proportion of glycerin or other low-evaporative ingredient to insure in the coated vehicular member, a degree of flexibility to admit of its being coiled upon and then paid out from a core or reel that will add greatly to the convenience of storing, merchandizing, and using it. Notwithstanding the existence of the colloid coated cord of lasting pliability and capable of manipulation to and from a winding core and into the soil in which the seeds are to be sprouted, it is to be understood that when embedded in the soil, and regardless of the degree of rigidity the colloid absorbs moisture and becomes soft.

There are numerous colloids suitable to the purposes of the present invention, some of which are gelatinous colloids in general; gluten; vegetable and animal glues; agar-agar; kelp; seaweed, flax and other vegetable seeds, etc. These colloids may be rendered more definitely form-retaining by the use of binders such as linters, ground cotton seed hulls, with lint attached, etc.

Of the fertilizers desirable for adding plant food to the moisture yielded by the hygroscopic colloid, may be mentioned solutions of natural manures; bonemeal; various mineral correctives of soil; commercial sources of ammonia, phosphoric acid and potash; and proprietary plant foods such as Vigoro and Loma.

Insecticides and parasite repellents conveniently employed (among others) are camphor, creosote, carbolic solution, insect powders, etc.

A desirable moisture retainer and one that may be employed in different proportions appropriate to the degree of moisture and pliability that may be desired, is glycerin.

The cord may be coated by dipping in solutions of the substances with which it is to be coated one or more times, with or without total drying or partial drying following each application.

Figure 2:
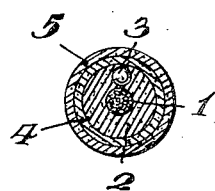

One preferred embodiment of the invention is illustrated in the accompanying drawing, wherein Fig. 1 is a perspective view with parts broken away in section, illustrating the seed assembly in accordance with the present invention, and Fig. 2 is a vertical sectional view along line 2—2 of Fig. 1.

In the drawing, the cord or string 1, which may be of any material and diameter, is surrounded by the colloidal jacket 2 in which is embedded the seeds 3 spaced at suitable intervals along the length of the string 1. The seeds may be disposed at different radial positions of the jacket 2 with respect to the string but nevertheless they are free to sprout in all directions regardless of the radial position of the individual seeds with respect to the central cord. The drawing also shows a colloidal jacket 4 containing plant food and an additional jacket 5 containing an insecticide or parasite repellent material. The several jackets 2, 4 and 5 are shown in exaggerated form for the purpose of clarity.

As described above, the plant food and/or insecticidal agents may be incorporated in the colloidal jacket 2 instead of in the form of independent coatings or layers.

When a planting cord has been prepared in accordance with the foregoing specification, and with seeds embedded in the colloidal jacket at desired intervals, this cord with its contained moisture; its surrounding coating of plant food;

and with or without a protective coating of insecticide, may be planted manually by laying it in a provided trench in the soil and covering it to the desired depth, or it may be deposited at a desired depth by one of the known types of planting plows; or it may be pressed into the soil by a grooved disk as it unwinds from a suitable reel carried by the implement and covered by a compounder wheel. In any case, the colloidal seed bearing jacket at once commences to supply germinating moisture and to draw more moisture from the soil until it becomes soft and yielding to the germination process and at the same time uses moisture to digest plant food and hold it within reach of the sprouting seeds.

I claim:

1. As a new article of manufacture, a cord surrounded by a conforming plastic envelope of water-soluble colloidal substance having inherent pliability that permits the cord to be wound upon and paid out from a reel, and having seeds embedded in the said envelope and thereby united to the cord to form a self-sustaining structure consisting of said cord, colloidal substance and seeds.

2. As a new article of manufacture, a cord surrounded by an envelope comprising a water-soluble colloidal substance having inherent pliability that leaves the cord free to flex in being gathered upon and paid out from a winding reel; said envelope having a sufficient thickness for seeds embedded therein and united thereby to the cord and left free to sprout in substantially all radial directions around the enveloped cord, and forming a self-sustaining structure consisting of said cord, colloidal substance and seeds.

3. As a new article of manufacture, a cord surrounded by a conforming plastic envelope of water-soluble colloidal substance having inherent pliability that permits the cord to be wound upon and paid out from a reel, seeds embedded in the said envelope and thereby united to the cord, and a soil treating medium surrounding said colloidal envelope, said medium being in the form of a coating located upon and separated from the cord by the material of the envelope.

4. As a new article of manufacture, a cord surrounded by a conforming plastic envelope of water-soluble colloidal substance having inherent pliability that permits the cord to be wound upon and paid out from a reel, seeds embedded in the said envelope and thereby united to the cord, and a soil treating medium surrounding said cord and incorporated therewith through the medium of said envelope.

5. As a new article of manufacture, a cord surrounded by a conforming plastic envelope of water-soluble colloidal substance having inherent pliability that permits the cord to be wound upon and paid out from a reel, seeds embedded in the said envelope and thereby united to the cord, and a jacket containing a plant food and an additional jacket containing an insecticidal agent surrounding said cord with the envelope and seeds therearound.

6. An article of manufacture as described in claim 1 in which the colloidal envelope has incorporated therewith an ingredient that retards drying and maintains the envelope in pliable state when cold.

ALBERT C. FISCHER.